(12) United States Patent
Chen

(10) Patent No.: US 7,256,795 B2
(45) Date of Patent: Aug. 14, 2007

(54) EXTENDED POWER MANAGEMENT VIA FRAME MODULATION CONTROL

(75) Inventor: I-Cheng Chen, Markham (CA)

(73) Assignee: ATI Technologies Inc., Markham, Ontario (CA)

( * ) Notice: Subject to any disclaimer, the term of this patent is extended or adjusted under 35 U.S.C. 154(b) by 149 days.

(21) Appl. No.: 10/210,744

(22) Filed: Jul. 31, 2002

(65) Prior Publication Data

US 2004/0021658 A1    Feb. 5, 2004

(51) Int. Cl.
*G09G 5/02* (2006.01)

(52) U.S. Cl. .................. 345/597; 345/169; 345/596; 345/598

(58) Field of Classification Search ............... 345/586, 345/84, 72, 83, 88, 89, 549, 588–600, 690–697, 345/602, 102, 169, 211–214; 710/1; 379/102.03
See application file for complete search history.

(56) References Cited

U.S. PATENT DOCUMENTS

| | | | | |
|---|---|---|---|---|
| 5,406,310 A | * | 4/1995 | Aschenbrenner et al. ... | 345/602 |
| 6,256,378 B1 | * | 7/2001 | Iggulden et al. ........ | 379/102.03 |
| 6,362,834 B2 | * | 3/2002 | Ishii ........................... | 345/690 |
| RE38,108 E | * | 5/2003 | Chee et al. ................. | 345/212 |
| 6,731,299 B2 | * | 5/2004 | Wang et al. ................ | 345/596 |
| 6,778,186 B2 | * | 8/2004 | Mehigan ..................... | 345/596 |
| 2002/0147861 A1 | * | 10/2002 | Bui et al. ....................... | 710/1 |
| 2002/0163523 A1 | * | 11/2002 | Adachi et al. .............. | 345/536 |
| 2003/0030611 A1 | * | 2/2003 | Kim et al. .................... | 345/89 |
| 2003/0030618 A1 | * | 2/2003 | Jones .......................... | 345/102 |
| 2003/0179393 A1 | * | 9/2003 | Huovinen ................... | 358/1.9 |
| 2003/0202000 A1 | * | 10/2003 | Kudo et al. ................. | 345/690 |

\* cited by examiner

*Primary Examiner*—David L. Lewis
(74) *Attorney, Agent, or Firm*—Vedder Price Kaufman & Kammholz, P.C.

(57) ABSTRACT

Power consumption in a portable computer device that provides true-color simulation on a liquid crystal display can be realized by selectively operating a graphics controller that drives the LCD to selectively enable or disable true color simulation. Disabling dithering which provides true color simulation in an LCD, can significantly reduce power consumption by a portable computer device.

19 Claims, 4 Drawing Sheets

EXTENDED POWER MANAGEMENT VIA FRAME MODULATION CONTROL

FIELD OF THE INVENTION

The present invention relates to a method and apparatus for reducing electric power consumed by electronic equipment that uses liquid crystal displays.

BACKGROUND OF THE INVENTION

Many portable computer devices such as laptop computers, personal digital assistants (PDAs) and portable video game consoles use liquid crystal displays (LCDs) as an output display device. A problem that such devices contend with is battery life. Battery life in portable electronic equipment that use a liquid crystal display is adversely affected when a color-capable liquid crystal display is operated in a so-called true-color simulation mode.

True-color simulation on a color LCD attempts to improve color quality by a technique known as dithering. Dithering is a process by which true color can be simulated or approximated on an LCD by having successive frames of an image displayed with different colors in each successive frame so as to blend or merge the color displayed in one frame, with the color displayed in a subsequent frame thereby giving an observer the impression that the displayed color is a mix or dither of the different colored pixels in each frame.

A problem with true color simulation on a LCD is the amount of electric power that true color simulation requires. Because a liquid crystal display is a capacitive device, each pixel color change from one frame to the next requires charging and discharging a capacitor. Charging and discharging a capacitor in order to provide dithering, consumes more power than a non-dithered display. Although dithering can provide better picture quality, dithering consumes more power than a non-dithered display. In portable computer devices that use LCDs, a method and apparatus by which a portable computer device user can select either a reduced-power consumption mode or a higher-picture quality dithering mode would be an improvement over the prior art.

DETAILED DESCRIPTION OF THE PREFERRED EMBODIMENTS

Figure 1:
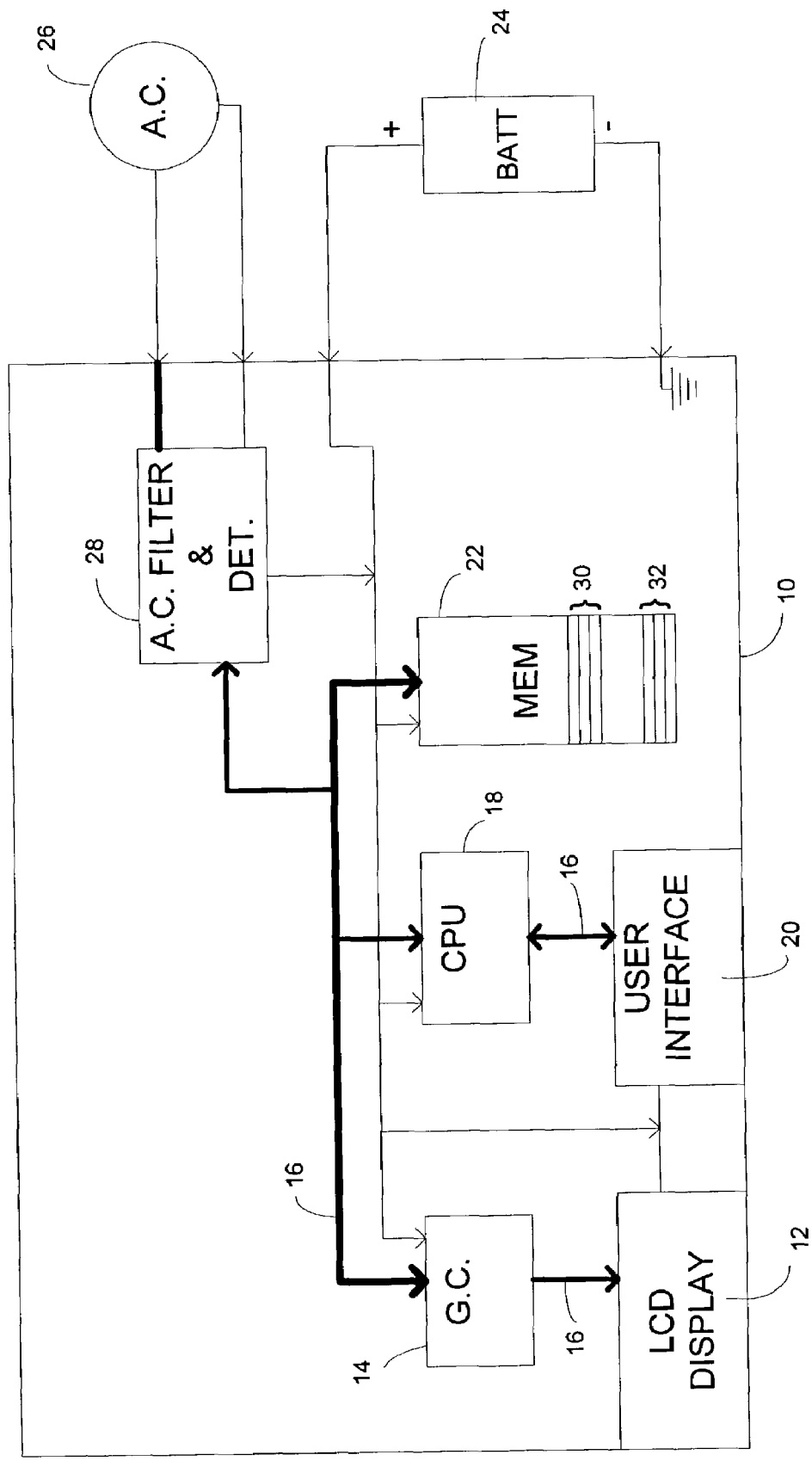
FIG. 1 displays a block diagram of a portable computer device.

FIG. 1 shows a block diagram of a portable computer device 10. The portable computer device 10 can be embodied as a laptop or portable personal computer, a personal digital assistant (PDA), a portable video gaming console, a global positioning navigation device or any other device that uses a liquid crystal display as an output device on which content, i.e., graphics, video and/or text, is made visually observable to a user of the portable computer device 10.

The liquid crystal display 12 is operably coupled to a graphics controller 14 via a control bus 16. The graphics controller 14 receives information from the CPU 18 and processes the information into signals that generate or render an image on the LCD 12.

The graphics controller 14 is operatively coupled to the central processor unit (CPU) 18. Those of skill in the art know that the CPU 18 can be embodied as a microprocessor, microcontroller, field programmable gate array or an application specific integrated circuit or any other device by which a finite state machine can be implemented.

A user input interface 21, such as a keyboard or tactile-sensitive input screen enables a user to input commands and other information into the portable computer device 10. The user input interface 21 is operatively coupled to the central processor unit 18 via the control bus 16.

Operation of the portable computer device 10 is effectively controlled by program instructions that reside in a memory device 22. As shown in FIG. 1, the memory device 22 is coupled to the central processor unit 18 via the control bus 16 so that the CPU 18 can read instruction from and write data to the memory device 22. Stored programs in the memory 22 enable the portable computer device to be software controlled. The stored instructions in the memory device 22 provide functionality to the portable computer device 10.

The portable computer device 10 can be operated from a battery 24 or an AC power source 26. When operated from an AC power source 26, the AC power is filtered and detected by an AC filter and detection circuit 28. The AC filter and detection circuit 28 is also operatively coupled to the CPU 18 via the control bus 16 enabling the CPU 18 to detect when the portable computer device 10 is operated from either the battery 24 or an AC power source 26.

When the CPU 18 detects (via the AC filter and detection circuit 28) that the portable computer device 10 is operated from a battery 24 (or other limited life power source) the CPU 18 can change the mode of operation of the graphics controller 14 (under software control) so as to conserve battery power, or the CPU 18 can operate the LCD display 12 to render more life-like colors in a true-color simulation mode.

As set forth above, true-color simulation by a LCD is accomplished by dithering. LCD dithering consumes more power than non-dithering because the LCD is essentially a capacitive device. A true-color-simulating, dithering mode consumes more electric power than a non-dithering mode because changing the color of a pixel in successive frames requires charging and discharging capacitance from one frame to the next. For purposes of claim construction, the process of changing the color of a picture element in successive frames, is known as dithering.

Those of skill in the art know that true color simulation on an LCD consumes more power than the LCD would require when not operated in a true color simulation. A problem with operating an LCD in a non-dithering mode however is the picture quality is degraded as compared to when the LCD is operated with true color simulation. When a battery-powered portable computer device with an LCD dithers the display to improve picture quality, the power consumed by the LCD is higher than when the dithering is turned off. Power consumption by an LCD, (and hence by a portable computer device that uses an LCD) can be reduced, by not executing (or jumping over) the program instructions 30 in memory 22 that cause the graphics controller 14 to perform the dithering function. Stated alternatively, by controlling the graphics controller 14 to turn dithering on and off, power consumption by the LCD 12 can be reduced. Dithering can be turned on and off by appropriate control of the graphics controller 14 that drives the LCD 12.

Figure 2:
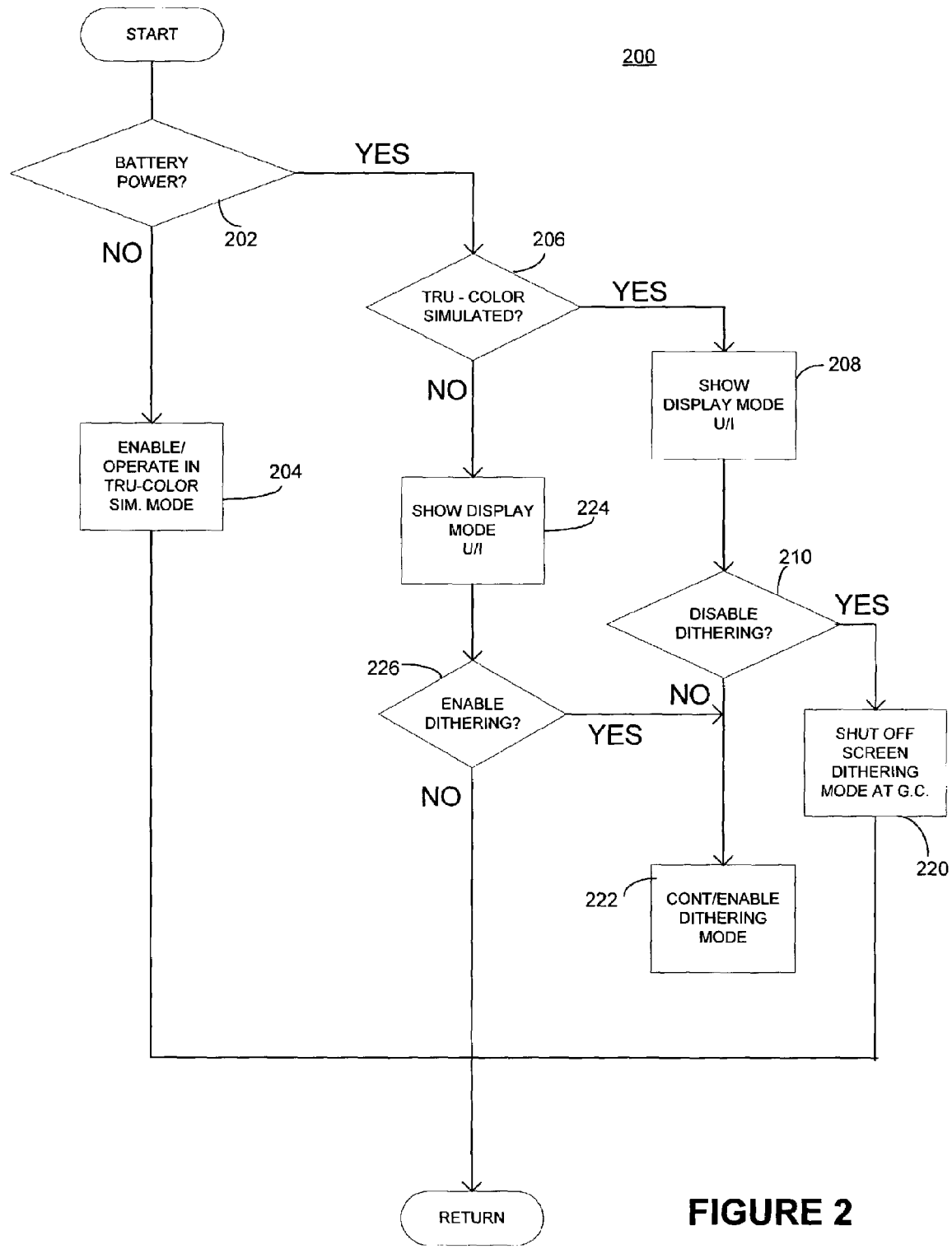
FIG. 2 is a flow chart depiction of a method for providing user-specified power management in a portable computer device.

FIG. 2 shows a flowchart depiction of a method 200 for providing user-specified power management in a portable computer device 10 having a graphics controller 14 that controls a liquid crystal display 12 on which content is displayed.

In step 202 the CPU 18 detects whether the portable computer device 10 is operated from a battery 24 or an AC power source 26. If the portable computer device 10 is detected by the CPU 18 as being operated from an AC power source 26, program control passes to step 204 whereby the graphics controller 14 continues to operate the LCD 12 in a dithering mode.

If at step 202, the CPU 18 detects from signals from the AC filter and detector circuit 28, that the portable computer device 10 power source is a battery 24, the CPU 18, tests in step 206, whether the graphics controller 14 is being operated in a true-color simulation mode. Detecting whether the true color simulation mode is operating can be accomplished by the content being displayed on the liquid crystal display 12, as well as the identity of an application program executing on the CPU 18 as well as user preferences that might be stored in memory 32.

If an application program running on the CPU 18 requires a true color simulation, e.g. a movie for instance, program control proceeds to step 208 where the CPU 18, displays on the LCD device 12, a user interface by which the portable computer device user can select whether to continue to operate in a true color, i.e., high-power consumption display mode or to disable the dithering thereby saving battery power. At step 210, the CPU 18 can selectively disable dithering (step 220) or enable the true color simulation mode to continue at step 222.

The user interface presented at step 208 can include a WINDOWS™ style dialog box or window. The user interface can also include softkeys, the user-actuation of which causes the display to be operated in a true-color simulation or non-dithered mode.

Returning to step 206, if the CPU 18 detects that there is no true color simulation being performed by the graphics controller, at step 224, the CPU 18 can display the user interface again, enabling the user of the portable computer device to specify whether he wants dithering turned on in step 226 with program control proceeding to step 222 or keeping the dithering function disabled to conserve power.

Using the methodology displayed in FIG. 2, a user of a portable computer device with a graphics controller 14 that drives or controls a liquid crystal display 12 on which content such as video, graphics or text is displayed can select whether to operate the LCD 12 in a dithering mode so as to render higher quality or true-color simulation or a power conserving, lower-quality graphics mode. By operating the graphics controller in a dithering mode, the LCD display will render higher-quality color output but at the cost of increased power consumption from the battery 24. If the user elects to operate the graphics controller 14 in a non-dithering mode, power consumption by the portable computer device 10 can be significantly reduced.

Figure 3:
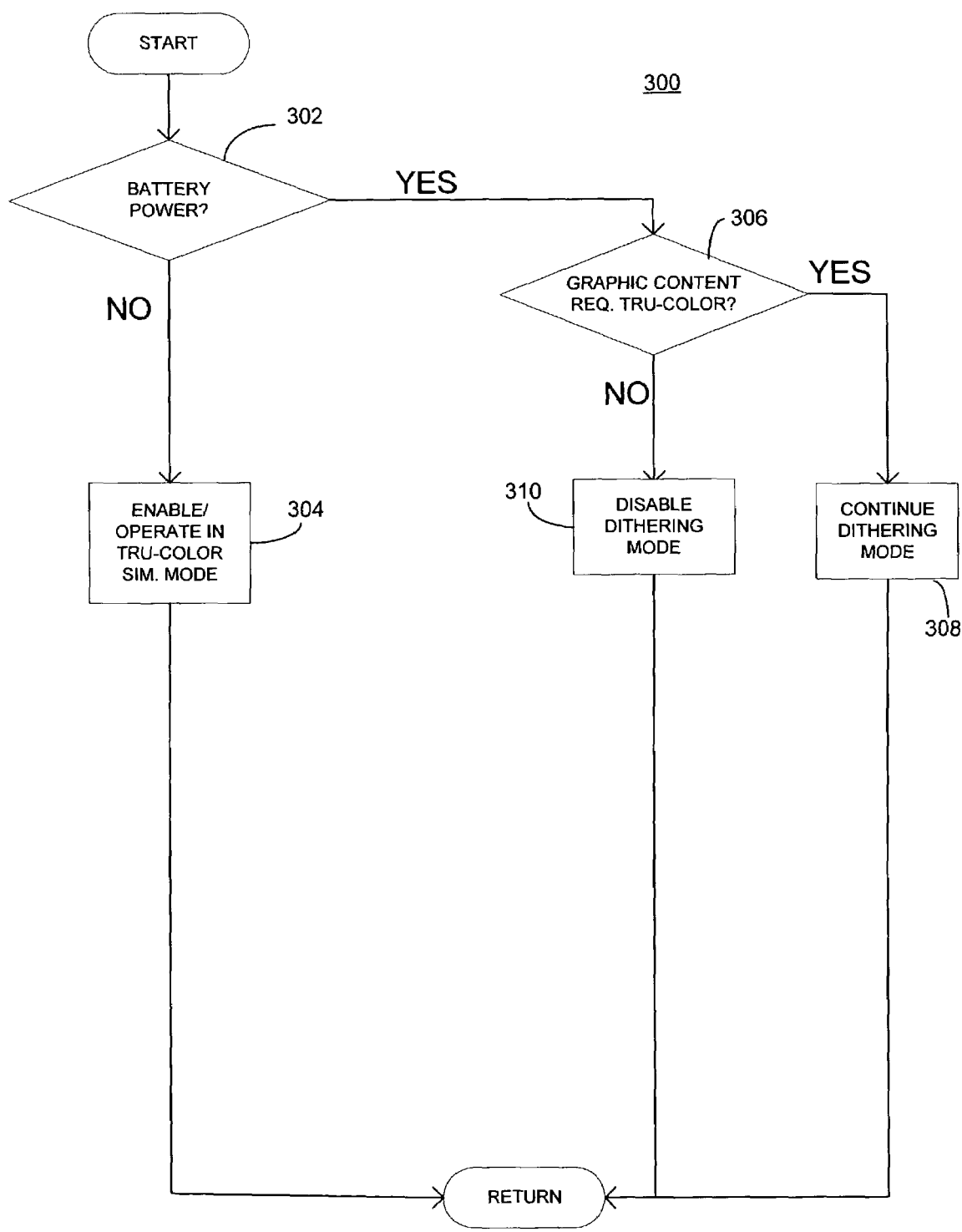
FIG. 3 is a flow chart depiction of another method for providing user-specified power management in a portable computer device.

FIG. 3 shows another flowchart depiction of another method 300 for providing user-specified power management. At step 302, the CPU detects whether the power source for the portable computer device 10 is either an AC power source 26 or battery 24. If the power source is an AC power source program control proceeds to step 304 whereby true color mode simulation can be continued.

At step 306, program instructions stored in memory 22 instruct the CPU 18 to decide whether the content displayed by the LCD 12 requires a true color simulation. By way of example, if the LCD is being used to display a video, high quality graphics image or other content best displayed with true color simulation, program control at step 306 provides for the continued dithering mode display at step 308, albeit at the expense of higher power consumption by whatever power source is provided to the portable computer device 10. If the CPU 18 detects that the displayed content on the LCD does not require true color simulation, the CPU 18 can automatically disable the dithering mode at step 310. Disabling display dithering can be accomplished by the CPU 18 instructing the graphics controller 14 to not dither images. The CPU 18 can accomplish this by programming the appropriate set up parameters in the graphics controller 14 based on the detected display modes requested by the program.

Using the method disclosed in FIG. 3, a portable computer device, can reduce the amount of power it consumes by detecting when the portable device is operated from a battery. A CPU or other controller for the personal computer device can selectively operate the graphics controller 14 in either a true color simulating graphics dithering mode or a non-dithering mode so as to reduce power consumption. If the content displayed on the LCD device 12 requires truecolor simulation, (i.e., it is best seen using dithering) the control software as executed by the CPU 18 will retain image quality over power conservation and continue to operate the device in a true-color simulating, dithering mode.

Figure 4:
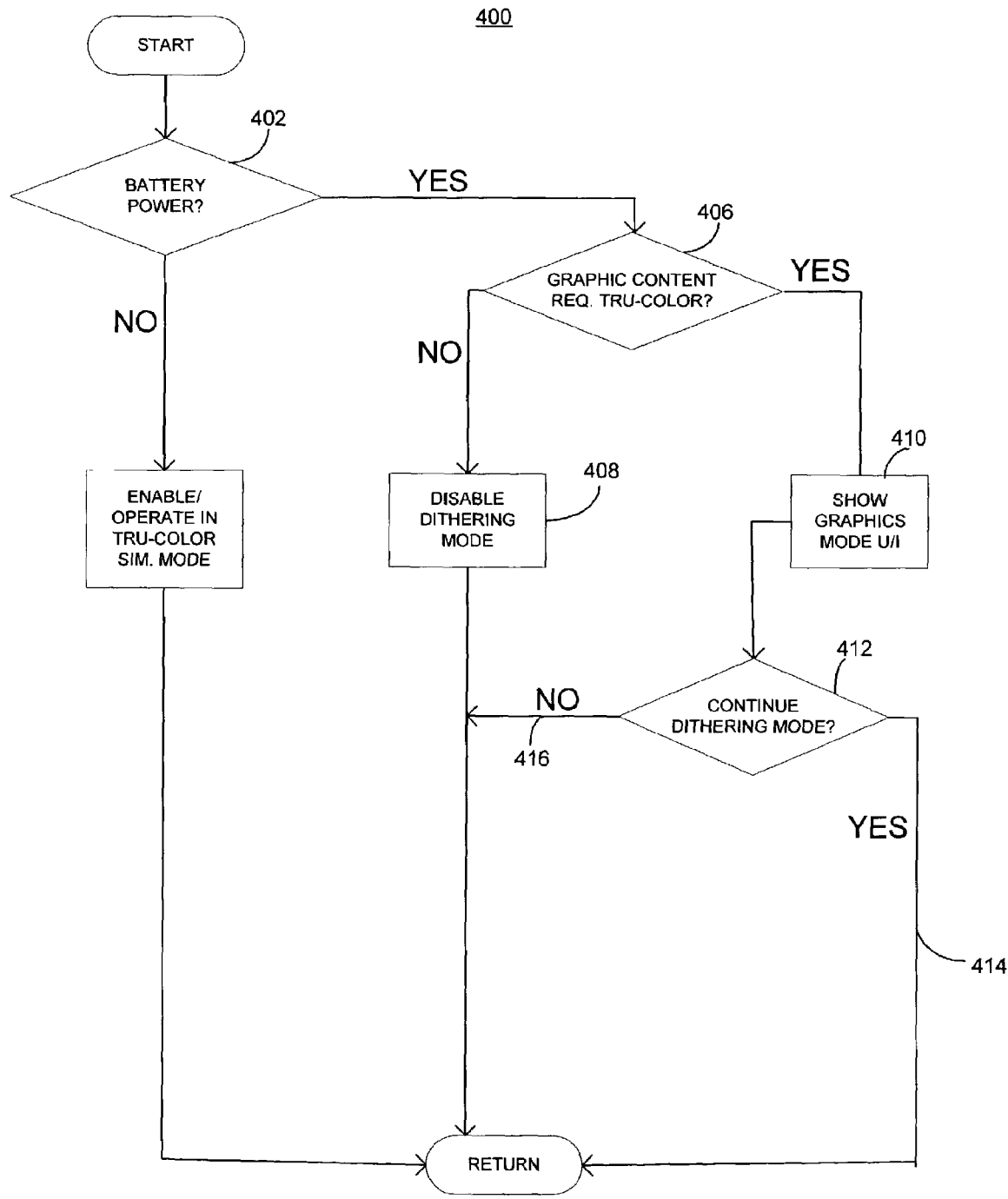
FIG. 4 is a flow chart depiction of another method for providing user-specified power management in a portable computer device.

FIG. 4 depicts another flowchart representation of a method 400 for providing a user-specified power management in a portable computer device.

If the CPU 18 detects that the power source for the personal computer device 10 has transitioned from an AC source to a battery 24 program control proceeds to step 406 where the CPU 18 determines whether the graphics contents displayed on the LCD device 12 requires true color. If the CPU 18 determines that the displayed content does not require true color, the CPU 18 automatically disables the dithering mode in step 408.

If at step 406 the CPU detects that the displayed content on the LCD display 12 requires, or is best viewed with true color, in step 410, the CPU 18 displays (shows) on the LCD 12, a graphics mode user interface. The graphics mode user interface can be any appropriate user interface whereby a portable computer device user can specify via the user input interface 20 whether to continue to operate the device with a true color simulation or in a power saving non-dithering mode. Examples of a graphics mode user interface include softkeys or WINDOWS™ dialog boxes.

At step 412, the CPU 18 detects whether the user of the portable computer device wishes to continue with the dithering mode 414 or to disable dithering at step 416.

Using the method of FIG. 4, a user of a portable computer device can specify whether to continue to display content in either a true color simulating graphics dithering mode or a non-dithering mode so as to reduce power consumption by the liquid crystal display 12. By providing to the user, a user interface by which the user can select which mode to operate, the user can determine whether battery life or output quality is more important.

In the preferred embodiments, the graphics controller 14 is operable in either a temporal dithering mode, a spatial dithering mode or a combination of both temporal and spatial dithering modes. Those of skill in the art know that a temporal dithering mode changes the color of picture elements in successive frames over time. Stated alternatively, the same picture element in one frame may be of one color and a different color in a subsequent frame so as to produce a simulation of so-called true color output. Spatial dithering is generally considered to be the display of differently colored adjacent pixels in a frame so that when the closely-spaced adjacent pixels are viewed they appear to be of a color that represents the blend of the two-differently colored pixels. By using both spatial and temporal dithering, the relatively limited color bandwidth of an LCD can be made to appear more dynamic.

By controlling the mode in which a graphics controller is operated, so as to control the mode in which a liquid crystal display is operated, significant power savings in a portable computer device can be realized. In addition to changing the clock speed of a graphics controller in order to limit the amount of power that a graphics controller consumes, the amount of power that the display device consumes can also be controlled albeit through the graphics controller.

What is claimed is:

1. A method for providing user-specified power management in a portable computer device having a graphics controller and a liquid crystal display on which content is displayed comprised of:
    enabling a user to select either a dithering mode of operation for said graphics controller or a non-dithering mode of operation for said graphics controller so as to reduce power consumption by said liquid crystal display; and
    wherein the dither mode of operation includes changing a color of a pixel in successive frames.

2. The method of claim 1 wherein said graphics controller dithering mode is either a temporal dithering mode, a spatial dithering mode, or a combination of both temporal and spatial dithering modes.

3. The method of claim 2 wherein said graphics controller dithering modes display successive frames of differently-colored shades so as to provide a true-color simulation.

4. A method for providing user-specified power management in a portable computer device having a graphics controller and a liquid crystal display on which content is displayed comprised of:
    providing a software-controlled user interface for said graphics controller;
    enabling a user, via said user interface, to control said graphics controller to be operable in a graphics dithering mode providing at least a simulated true-color output on said liquid crystal device, or in a reduced-power-consumption, non-dithering mode of operation for said liquid crystal device.

5. The method of claim 4 wherein said graphics controller dithering mode is either a temporal dithering mode, a spatial dithering mode, or a combination of both temporal and spatial dithering modes.

6. The method of claim 5 wherein said graphics controller dithering modes display successive frames of differently-colored shades so as to provide a true-color simulation.

7. A method for providing user-specified power management in a portable computer device having a graphics controller and a liquid crystal display comprised of:
    detecting when said portable computer device is operated from a battery;
    selectively operating the graphics controller in either a true-color simulating graphics dithering mode or a non-dithering mode of operation so as to reduce power consumption by said liquid crystal display.

8. The method of claim 7 wherein said step of selectively enabling the graphics controller is further comprised of: providing a user-interface to a user of said portable device to enable the portable device user to specify the graphics controller's mode of operation as either a dithering mode or a non-dithering mode.

9. The method of claim 7 wherein said step of selectively enabling the graphics controller is further comprised of: automatically operating said graphics controller in said non-dithering mode.

10. The method of claim 7 wherein said step of selectively enabling the graphics controller is further comprised of: automatically operating said graphics controller in said non-dithering mode, if the content displayed on the liquid crystal display does not require true-color or a true-color simulation.

11. The method of claim 7 wherein said graphics controller dithering mode is either a temporal dithering mode, a spatial dithering mode, or a combination of both temporal and spatial dithering modes.

12. The method of claim 11 wherein said graphics controller dithering modes display successive frames of differently-colored shades so as to provide a true-color simulation.

13. A method for providing user-specified power management in a portable computer device having a graphics controller and a liquid crystal display comprised of:
    detecting when said portable computer device is operated from a battery;
    determining when said portable computer device is displaying on said liquid crystal display, content that contains color;
    if said content contains color, selectively operating the graphics controller in either a graphics dithering mode to render true-color simulation, or a non-dithering mode of operation for so as to reduce power consumption by said liquid crystal display.

14. The method of claim 13 wherein said step of selectively operating the graphics controller is comprised of: operating said graphics controller in a non-dithering mode under software control when said portable computer device operates from a battery.

15. The method of claim 13 wherein said step of selectively operating the graphics controller is comprised of: operating said graphics controller in a non-dithering mode under software control when said portable computer device operates from a battery and when any content displayed on said liquid crystal display is not displaying true-color content.

16. A portable computer device having a liquid crystal display comprised of:
    a central processor means, providing a software controlled power management user interface;
    a graphics controller operably coupled to the central processor, said graphics controller being operable via said user interface in a graphics dithering mode to provide a true-color simulation by said liquid crystal display, or a non-dithering mode of operation to reduce power consumption by said liquid crystal display.

17. The portable computer device of claim 16 wherein said graphics controller dithering mode is either a temporal dithering mode, a spatial dithering mode, or a combination of both temporal and spatial dithering modes.

18. The portable computer device of claim 17 wherein said graphics controller dithering modes display successive frames of differently-colored shades so as to provide a true-color simulation.

19. A method for providing user-specified power management in a portable computer device having a graphics controller and a liquid crystal display on which content is displayed comprised of:

enabling a user to select either a dithering mode of operation for said graphics controller or a non-dithering mode of operation for said graphics controller so as to reduce power consumption by said liquid crystal display;

wherein the dither mode of operation includes changing a color of a pixel in successive frames; and wherein said graphics controller dithering modes display successive frames of differently-colored shades so as to provide a true-color simulation.

* * * * *